Patented Apr. 17, 1945

2,373,763

UNITED STATES PATENT OFFICE 2,373,763

ENTERIC COATING

Rudolph A. Kuever and Paul V. Maney, Iowa City, Iowa, assignors to The State of Iowa, for the use and benefit of the State University of Iowa, Iowa City, Iowa No Drawing. Application November 24, 1941, Serial No. 420,318

2 Claims. (Cl. 167—82)

This invention relates to an enteric coating for individual doses of medicine such as tablets, capsules and pills.

The use of enteric coatings on such doses is on the increase due to the necessity for administration of medicines which pass through the stomach unchanged but disintegrate in the fluids of the intestines. Drugs delivered in this manner are of value in eliminating contact of highly irritating concentrations with the mucous membrane of the stomach and by avoidance of possible interference with the digestive processes of the stomach by the forming of precipitates with the pepsin, peptones or the like.

Further value lies in securing delivery of high concentrations to the desired portion of the intestinal tract by permitting drugs which are otherwise rendered inactive by the secretions of the stomach to be delivered to the intestinal tract in therapeutically active form.

Recent disclosures indicate that the delayed action secured in this manner will permit administration of medicines with a minimum of sleep interference.

As examples of drugs with which enteric coatings are used, the following is a partial list of the more common: sodium and potassium chloride; magnesium sulfate; potassium nitrate; ammonium sulphate; ammonium chloride; ferrous sulfate; salts of salicyclic acid; methenamine and sodium biphosphate; mandelic acid; emetine and bismuth compounds; aminophyllin theobromine; sodium acetate; phenobarbital; sulfanilamide; pancreatin; bile salts; extract of bile; ovarian substances; thyroid; digitalis; gentian violet; antiseptics, and anthelmintics which are either encapsulated or prepared in tablet or pill form.

Enteric coatings now commonly employed are in many cases unsatisfactory. Either they dissolve or disintegrate in the fluids of the stomach or they do not dissolve at all, passing through the entire alimentary canal unchanged. The use of shellac as an enteric coating has been recommended. A series of tests revealed that over a period of time tablets so coated increased their disintegrating time. Many tablets so coated were found not to disintegrate at all. Salol and keratin are being employed. Both were found unsatisfactory.

The solid fatty acids, such as stearic acid, have been used on the basis that there is no digestion or emulsification of fats in the acid fluids of the stomach, but that there is such digestion and emulsification in the fluids of the intestines. This does not prove to be the case because the chyme ejected from the stomach into the intestines usually remains acidic for a considerable period of time. Moreover, the alkalinity of the intestinal juices is usually insufficient. The solid fatty acids, in the form of a coating, require a higher pH index to dissolve than is usually found in the intestines under normal conditions. In order that the fatty acids may dissolve rapidly in the fluids of the intestines, it is necessary that they be finely divided by means of suspension and emulsification.

A satisfactory enteric coating should resist the gastric juice for a period of at least six hours and disintegrate within a relatively short period of time upon passing into the intestinal tract irrespective of whether the intestinal environment is alkaline, neutral or feebly acidic.

We have found that a highly satisfactory enteric coating can be made using as a base a fatty acid selected from the group myristic, lauric and stearic acid but having combined therewith emulsifying and coating dissolution timing agents in proper proportion.

A satisfactory coating can be prepared according to the following formula.

| | Per cent |
|---|---|
| Myristic acid | 68 |
| Hydrogenated castor oil | 25 |
| Castor oil | 2 |
| Cholesterol | 1 |
| Sodium taurocholate | 4 |

The myristic acid, hydrogenated castor oil and castor oil mixture is the enteric coating base. These three substances in the above amounts provide a coating of precisely the proper consistency which is neither too soft nor too brittle. The cholesterol and sodium taurocholate are the emulsifying and timing agents which cause the coating to disintegrate by suspension and emulsification soon after the medicinal body so coated has left the stomach and passed into the intestines.

This coating resists the gastric juice successfully for more than ten hours.

While the example given above gives excellent results the ingredient content may be varied. For example, the myristic acid content may be varied from 48 to 88 per cent; the hydrogenated castor oil from 45 to 5 per cent; the castor oil from 1 to 3 per cent; the cholesterol from ½ to 2 per cent and the sodium taurocholate from three to five per cent. This range in percentages may appear to be large but actual practice proves that an acceptable coating may be produced within the given ranges. If a very firm coating is desired the myristic acid content is decreased and the content of the hydrogenated castor oil increased. The castor oil content is varied to change the elasticity or flexibility of the coating and the amounts of the timing factors, the cholesterol and the sodium taurocholate may be increased or decreased as it is desired to hasten the speed of disintegration or lessen it. By these variations individual doses of medicine may be coated suitably to the dosage characteristics of each type.

Moreover, we do not propose to limit ourselves to the use of myristic acid as the fatty acid base in this combination. We have found that lauric and stearic acids give fairly good results, or that mixtures of these together with myristic acid may be employed. Nor do we propose to limit ourselves to the use of hydrogenated castor oil, because we have found other hydrogenated fixed oils, as for example hydrogenated soja bean oil, to give fair results. The castor oil may be replaced by another suitable fixed oil, as for example sesame oil. Sodium taurocholate may be replaced by sodium glycocholate or whole bile salts.

The coating of the given example is prepared as follows: Melt the myristic acid, hydrogenated castor oil, castor oil, and cholesterol and dilute these with an equal volume of a mixture of equal parts of ethylene dichloride and benzin. To this mixture add the sodium taurocholate previously dissolved in ten times its own weight of absolute ethyl alcohol. The coating in solution is then applied by a coating apparatus in the usual manner, at 50° C., using special precaution to build it of uniform thickness.

What we claim is:

1. An enteric coating comprising from 48% to 88% of myristic acid, from 45% to 5% of hydrogenated castor oil, from 1% to 3% of castor oil, from ½% to 2% of cholesterol and from 3% to 5% of sodium taurocholate.

2. An enteric coating comprising, myristic acid 68%, hydrogenated castor oil 25%, castor oil 2%, cholesterol 1%, and sodium taurocholate 4%.

RUDOLPH A. KUEVER.
PAUL V. MANEY.